(12) United States Patent
Wang

(10) Patent No.: US 11,917,613 B2
(45) Date of Patent: Feb. 27, 2024

(54) UPLINK TRANSMISSION RESOURCE SELECTION METHOD, TERMINAL AND STORAGE MEDIUM

(71) Applicant: SPREADTRUM COMMUNICATIONS (SHANGHAI) CO., LTD., Shanghai (CN)

(72) Inventor: Tingting Wang, Shanghai (CN)

(73) Assignee: SPREADTRUM COMMUNICATIONS (SHANGHAI) CO., LTD., Shanghai (CN)

(*) Notice: Subject to any disclaimer, the term of this patent is extended or adjusted under 35 U.S.C. 154(b) by 255 days.

(21) Appl. No.: 17/422,120

(22) PCT Filed: Jan. 9, 2020

(86) PCT No.: PCT/CN2020/071135
§ 371 (c)(1),
(2) Date: Sep. 28, 2021

(87) PCT Pub. No.: WO2020/143707
PCT Pub. Date: Jul. 16, 2020

(65) Prior Publication Data
US 2022/0132532 A1    Apr. 28, 2022

(30) Foreign Application Priority Data
Jan. 11, 2019   (CN) .......................... 201910028755.5

(51) Int. Cl.
*H04W 72/1268* (2023.01)
*H04W 72/566* (2023.01)

(52) U.S. Cl.
CPC ..... *H04W 72/1268* (2013.01); *H04W 72/569* (2023.01)

(58) Field of Classification Search
CPC .......... H04W 72/1268; H04W 72/569; H04W 72/23; H04W 72/56; H04W 72/21; H04W 72/02
See application file for complete search history.

(56) References Cited

U.S. PATENT DOCUMENTS

| 10,340,932 B2 | 7/2019 | Bandyopadhyay et al. |
| 2018/0049193 A1 | 2/2018 | Belleschi et al. |
| (Continued) | | |

FOREIGN PATENT DOCUMENTS

| CN | 102415187 A | 4/2012 |
| CN | 106031284 A | 10/2016 |
| (Continued) | | |

OTHER PUBLICATIONS

International Search Report dated Mar. 26, 2020 for International Patent Application No. PCT/CN2020/071135.
(Continued)

*Primary Examiner* — Dinh Nguyen
(74) *Attorney, Agent, or Firm* — Womble Bond Dickinson (US) LLP

(57) ABSTRACT

The present disclosure relates to an uplink resource selection method. Said method comprises: receiving at least one piece of uplink scheduling information; determining, according to the uplink scheduling information, a transmission priority of uplink resources indicated by the uplink scheduling information; and selecting an uplink resource for data transmission according to the transmission priority of the uplink resources.

17 Claims, 3 Drawing Sheets

(56) References Cited

U.S. PATENT DOCUMENTS

2018/0098349 A1* 4/2018 Sun ..................... H04W 72/20
2018/0332539 A1   11/2018 Fan
2021/0168794 A1*  6/2021 Zhang .................. H04L 5/0092

FOREIGN PATENT DOCUMENTS

| CN | 106961741 | 7/2017 |
| CN | 108207032 | 6/2018 |
| CN | 107920390 | 4/2019 |

OTHER PUBLICATIONS

R2-074149 Scheduling Information for Uplink scheduling, Panasonic, Oct. 8, 2007, Shanghai, China.
Extended European Search Report for Application No. PCT/CN2020071135, dated Apr. 8, 2022.

* cited by examiner

UPLINK TRANSMISSION RESOURCE SELECTION METHOD, TERMINAL AND STORAGE MEDIUM

CROSS-REFERENCE TO RELATED APPLICATION

This Application is a National Stage of International Application No PCT/CN2020/071135, filed on Jan. 9, 2020, which claims priority to Chinese Application No. 201910028755.5, filed on Jan. 11, 2019, both of which are incorporated by reference herein.

TECHNICAL FIELD

The present disclosure relates to the field of communication technology, and in particular to an uplink transmission resource selection method, a terminal, and a storage medium.

BACKGROUND

As communication technology is developing continuously, wireless communication has evolved from 2G voice interaction to 5G New Radio (NR) dual connectivity communication mode. In Time Sensitive Networking (TSN), data packets in transmission have a fixed latency and transmission period. NR technology can be used to support network services in which data packets are transmitted in deterministic periods. The RAN1#95 meeting pointed out that Bandwidth Part (BWP) resources of a serving cell may be used to configure and activate a plurality of resource configuration information for supporting a plurality of different services or communication types, and can also enhance data transmission reliability and reduce data transmission latency.

However, uplink resources corresponding to the configuration information may overlap or partially overlap in a time domain, which causes some data to fail to be transmitted in a current slot, thereby increasing data transmission latency. For some services with higher latency requirements, such as a ultra-reliable low-latency communication (URLLC) service, such a problem of failing to meet a demand for service transmission may occur.

SUMMARY

In view of the above, the present disclosure provides a selection method for uplink transmission resources, terminal, and storage medium, which can meet the service demand with higher latency requirements.

According to one aspect of the present disclosure, there is provided a method for selecting uplink resources, comprising:

receiving at least one piece of uplink scheduling information;

determining, based on the uplink scheduling information, transmission priorities of the uplink resources indicated by the uplink scheduling information; and selecting, based on the transmission priorities of the uplink resources, an uplink resource for data transmission.

According to another aspect of the present disclosure, there is provided a terminal, comprising a processor; and a memory configured to store instructions executable by the processor, wherein the processor is configured to execute the methods described above.

According to another aspect of the present disclosure, there is provided a non-transitory computer-readable medium storing computer program instructions, wherein the computer program instructions, when executed by a processor, implement the methods described above.

BRIEF DESCRIPTION OF THE DRAWINGS

The drawings, which are incorporated in and constitute part of the specification, together with the description, illustrate exemplary embodiments, features and aspects of the present disclosure and serve to explain the principles of the present disclosure.

DETAILED DESCRIPTION

Figure 1:
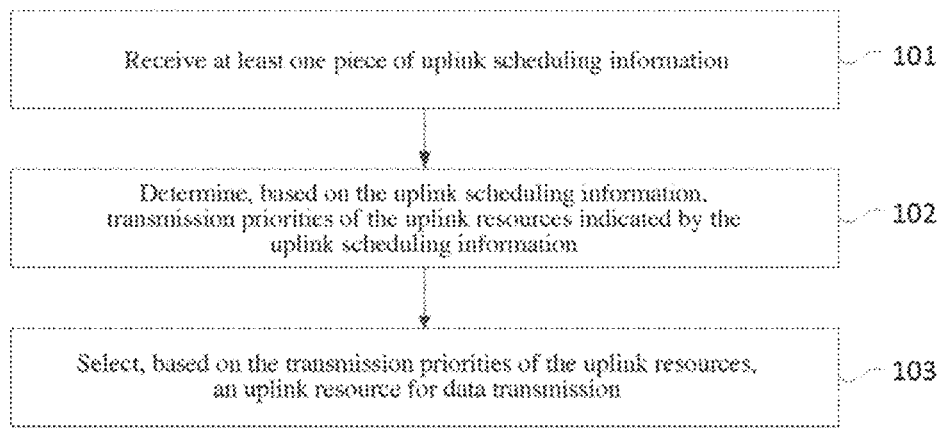
FIG. 1 illustrates a flowchart of selecting uplink resource according to an embodiment of the present disclosure.

Various exemplary embodiments, features, and aspects of the present disclosure will be described in detail with reference to the drawings. The same reference numerals in the drawings represent parts having the same or similar functions. Although various aspects of the embodiments are shown in the drawings, it is unnecessary to proportionally draw the drawings unless otherwise specified.

Herein the term "exemplary" means "used as an instance or example, or explanatory." An "exemplary" embodiment given herein is not necessarily construed as being superior to or better than other embodiments.

Numerous details are given in the following embodiments for the purpose of better explaining the present disclosure. It should be understood by a person skilled in the art that the present disclosure can still be realized even without some of those details. In some of the embodiments, methods, means, units and circuits that are known to a person skilled in the art are not described in detail so that the principle of the present disclosure become apparent.

In embodiments of the present disclosure, the terminal can receive at least one piece of uplink scheduling information, determine, based on the uplink scheduling information, transmission priorities of the uplink resources indicated by the uplink scheduling information, and select, based on the transmission priorities of the uplink resources, an uplink resource for data transmission. As a result, the terminal may select an uplink resource from the uplink resources indicated in the uplink scheduling information for data transmission, and transmit corresponding data using the selected uplink resource. If uplink resources overlap or partially overlap in a time domain, the terminal can select an uplink resource for current transmission based on the transmission priorities, thereby meeting the service data transmission demand with higher latency requirements Other features and aspects of the present disclosure will become clear from the following detailed description of exemplary embodiments with reference to the accompanying drawings In embodiments of the present disclosure, the terminal receives at least one piece of uplink scheduling information, and determines, based on the uplink scheduling information, transmission priorities of uplink resources indicated by the uplink scheduling information. Thus, the terminal may select, based on the transmission priorities of the uplink resources, an uplink resource for data transmission. Even when uplink resources corresponding to configuration information overlap or partially overlap in a time domain, the terminal can preferentially transmit data having a higher priority to meet a service data transmission demand with higher latency requirements. Herein uplink scheduling information may include semi-persistent scheduling information and dynamic scheduling information. The semi-persistent scheduling information can be used to support service in which data is transmitted in a determined period. Embodiments of the present disclosure can use semi-persistent scheduling information to schedule data transmission of service having determined periods.

In the related art, when uplink resources corresponding to semi-persistent scheduling information overlap or partially overlap with uplink resources corresponding to dynamic scheduling information in a time domain, the latter will be cover the former. If the uplink resources corresponding to dynamic scheduling information are used to transmit dserviceata in service data having a lower priority, such as enhanced Mobile Broadband (eMBB) service data, and the uplink resources corresponding to the semi-persistent scheduling information are used to transmit service data having a higher priority, such as URLLC service data, then the eMBB service data is transmitted in a current slot, which cannot timely transmit the URLLC service data. However, the URLLC service data generally requires a higher latency requirement. If the URLLC service cannot be transmitted timely, such a problem of failing to meet a demand for service transmission may exist. The scheme for selecting uplink transmission resources provided by the present disclosure can avoid the problem of failing to meet a demand for service transmission due to a delayed transmission.

The selection scheme for uplink transmission resources provided by the present disclosure will be described in detail with reference to the drawings.

FIG. 1 illustrates a flowchart of a method for selecting uplink transmission resources according to an embodiment of the present disclosure. As shown in FIG. 1, the method for selecting uplink transmission resources includes following 101-103.

The method includes receiving at least one uplink grant in 101.

A terminal may receive uplink scheduling information transmitted from the base station after establishing a communication connection with a base station. There is at least one piece of the uplink scheduling information herein, where one piece of the uplink scheduling information may indicate one of the uplink resources. The terminal may acquire the uplink scheduling information in Downlink Control Information (DCI) that is transmitted from the base station by an uplink dynamic scheduling mechanism. The uplink scheduling information may be used to indicate a resource configuration of uplink transmission on a physical uplink shared channel (PUSCH), so the terminal may configure an uplink resource based on the uplink scheduling information. The uplink scheduling information acquired via DCI may be referred to as dynamic scheduling information. Also, the terminal may acquire an uplink scheduling information in radio resource control (RRC) information, and the uplink scheduling information acquired via the RRC information is referred to as semi-persistent scheduling information. The semi-persistent scheduling information may be used to support a service in which data is transmitted in a determined period. The semi-persistent scheduling information may include type-1 semi-persistent scheduling information and type-2 semi-persistent scheduling information. The type-1 semi-persistent scheduling information may be acquired in the RRC information, and the type-2 semi-persistent scheduling information may be acquired in the RRC information and/or the DCI.

The method for selecting uplink transmission resources includes determining, based on the uplink scheduling information, transmission priorities of the uplink resources indicated by the uplink scheduling information in 102.

After acquiring at least one piece of uplink scheduling information, the terminal may determine, based on resource allocation information included in each piece of the uplink scheduling information, an uplink resource corresponding to the piece of the uplink scheduling information, and then determine, based on the piece of the uplink scheduling information, transmission priorities of the uplink resources. In response to receiving a plurality of uplink scheduling information, the terminal may determine multiple uplink resources based on the plurality of uplink scheduling information, with one piece of the uplink scheduling information indicates one of the uplink resources. Since the terminal corresponds to one uplink resource in one time domain, the terminal can select an uplink resource for current data transmission from the multiple uplink resources, thereby implementing an optimal allocation of the uplink resources.

The method for selecting uplink transmission resources includes selecting, based on the transmission priorities of the uplink resources, an uplink resource for data transmission in 103.

After determining the transmission priorities of the uplink resources indicated by the uplink scheduling information, the terminal may select an uplink resource for data transmission based on the transmission priorities. It should be noted that the terminal may select one or more uplink resources for data transmission in selecting an uplink resource for data transmission. When one uplink resource for data transmission is selected, the terminal may select an uplink resource having a highest transmission priority for data transmission. Selecting an uplink resource for data transmission may be interpreted as using a selected uplink resource to transmit data without using an unselected uplink resource to transmit the data. Alternatively, selecting an uplink resource for data transmission may be interpreted as using a selected uplink resource to transmit data while using an unselected uplink resource to perform other service. Particular implementation is not limited thereto.

With the method for selecting uplink resources provided in the foregoing embodiment, the terminal can determine transmission priorities of uplink resources indicated by uplink scheduling information. Thus, when uplink resources overlap or partially overlap in a time domain, the terminal can preferentially transmit data having a higher priority, thereby meeting a service data transmission demand with higher latency requirements.

Based on the method described above, embodiments of the present disclosure also provide a process for determining transmission priorities of uplink resources.

Figure 2:
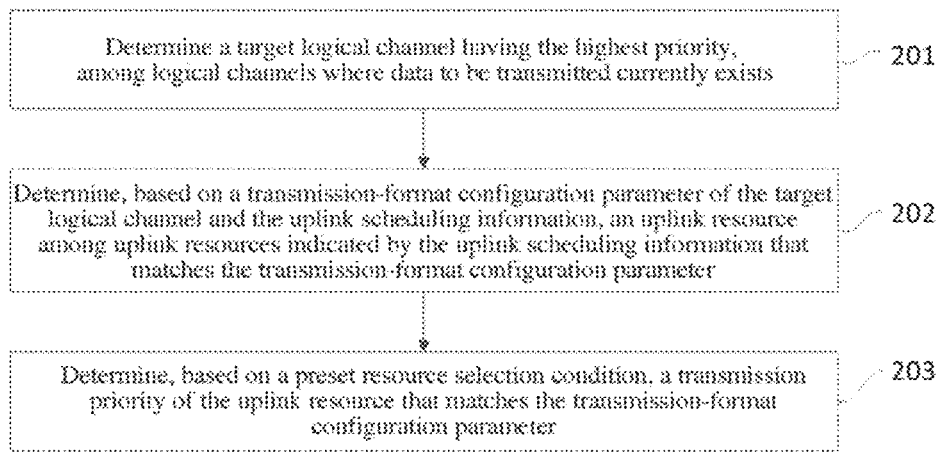
FIG. 2 illustrates a flowchart of determining transmission priorities of uplink resources according to an embodiment of the present disclosure.

FIG. 2 illustrates a flowchart of determining transmission priorities of uplink resources according to an embodiment of the present disclosure, which includes:

determining a target logical channel having the highest priority, among logical channels where data to be transmitted currently exists in 201;

determining, based on a transmission-format configuration parameter of the target logical channel and the uplink scheduling information, an uplink resource among uplink resources indicated by the uplink scheduling information that matches the transmission-format configuration parameter in 202; and determining, based on a preset resource selection condition, a transmission priority of the uplink resource that matches the transmission-format configuration parameter in 203.

There may be one or more Logical Channels (LCH) where data to be transmitted currently exists herein. If there are multiple logical channels where data to be transmitted exists, the terminal may select a logical channel among the multiple logical channels that has a highest priority as the target logical channel. A logical channel has a corresponding transmission-format configuration parameter that may include, but is not limited to, subcarrier spacing (SCS) and physical uplink shared channel duration (PUSCH-Duration). There may be multiple transmission -format configuration parameters of each logical channel. For example, each logical channel may have a corresponding SCS list and a maximum PUSCH-Duration, therein any transmission-format configuration parameter is eligible for a requirement of the logical channel. The terminal may match a transmission-format configuration parameter of the target logical channel with at least one piece of the uplink scheduling information. For example, the terminal determines one or more uplink resources among uplink resources indicated by the uplink scheduling information that match a transmission-format configuration parameter of the target logical channel by comparing SCS and PUSCH-Duration of the target logical channel with SCS and PUSCH-Duration in each piece of the uplink scheduling information.

The preset resource selection condition may include at least one of transmission latency of an uplink resource or transmission reliability of an uplink resource. Optionally, the transmission latency of an uplink resource may be characterized by the PUSCH-Duration or end time of the uplink resource. The transmission reliability of an uplink resource may be characterized by an MCS index value or a type of Radio Network Temporary Identifiers (RNTI).

For instance, in response to an uplink resource having shorter transmission latency, the terminal may set a higher transmission priority of the uplink resource. For example, the highest transmission priority may be set for an uplink resource that has the shortest PUSCH-Duration or earlier end time of an uplink resource. In response to an uplink resource having higher transmission reliability, the terminal may set a higher transmission priority of the uplink resource. For example, the highest transmission priority may be set for an uplink resource that has the smallest MCS index value, or an uplink resource indicated by an uplink scheduling information that is scrambled by a Modulation and Coding Scheme-Radio Network Temporary Identifier (MCS-RNTI) or Configured Scheduling-Radio Network Temporary Identifier (CS-RNTI).

Figure 3:
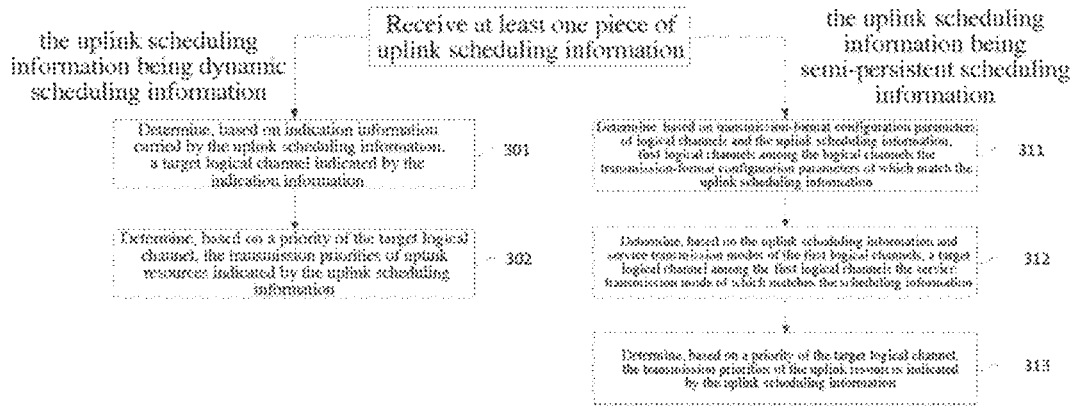
FIG. 3 illustrates a flowchart of determining transmission priorities of uplink resources according to an embodiment of the present disclosure.

FIG. 3 illustrates a flowchart of determining transmission priorities of uplink resources according to another embodiment of the present disclosure.

In response to the unlink scheduling information being dynamic scheduling information, determining transmission priorities of uplink resources includes:

determining, based on indication information carried by the uplink scheduling information, a target logical channel indicated by the indication information in 301; and determining, based on a priority of the target logical channel, the transmission priorities of uplink resources indicated by the uplink scheduling information in 302.

Herein, the terminal may receive a plurality of uplink scheduling information transmitted from the base station, with each piece of the uplink scheduling information indicating one of the uplink resources, and the plurality of uplink scheduling information corresponding to multiple uplink resources. When any one piece of the uplink scheduling information is dynamic scheduling information, the terminal may determine, based on indication information carried in the uplink scheduling information, one or more target logical channels indicated by the indication information. The indication information may be indication information that is added to the uplink scheduling information transmitted from the base station to the terminal for indicating a logical channel prioritized for data transmission. Embodiments of the present disclosure do not limit the number of bits of the indication information. The number of bits of the indication information may be proportional to accuracy at which the indication information is capable of the indication—that is, the higher the accuracy of the indication, the more the number of bits of the indication information may be. For example, if each terminal may configure N logical channels, and the N logical channels may be divided into M categories based on a descending order of the priority, then the number of bits of the indication information may be a result of rounding $\log_2^{M+1}$. N and M are each a positive integer and N is a multiple of M.

In determining the transmission priorities of uplink resources indicated by uplink scheduling information, the terminal may use priorities of the target logical channels as the transmission priorities of the uplink resources indicated by the uplink scheduling information.

In response to the uplink scheduling information being semi-persistent scheduling information, determining the transmission priorities of the uplink resources includes:

determining, based on transmission-format configuration parameters of logical channels and the uplink scheduling information, first logical channels among the logical channels the transmission-format configuration parameters of which match the uplink scheduling information in 311;

determining, based on the uplink scheduling information and service transmission modes of the first logical channels, a target logical channel among the first logical channels the service transmission mode of which matches the scheduling information in 312; and determining, based on a priority of the target logical channel, the transmission priorities of the uplink resources indicated by the uplink scheduling information in 313.

Optionally, in response to the uplink scheduling information being type-1 semi-persistent scheduling information in determining the first logical channels among the logical channels the transmission-format configuration parameters of which match the uplink scheduling information, the terminal may acquire the transmission-format configuration parameters of the uplink resources indicated by the uplink scheduling information in Radio Resource Control (RRC)

configuration information transmitted from the base station, and then determine, based on the transmission-format configuration parameters of the logical channels and the transmission-format configuration parameters of the uplink resources, the first logical channels among the logical channels the transmission-format configuration parameters of which match the transmission-format configuration parameters of the uplink resources.

Optionally, in response to the uplink scheduling information being type-2 semi-persistent scheduling information in determining the first logical channels among the logical channels the transmission-format configuration parameters of which match the uplink scheduling information, the terminal may acquire the transmission-format configuration parameters of the uplink resources in Radio Resource Control (RRC) configuration scheduling information and Downlink Control Information (DCI) activation signaling transmitted from the base station, or acquire the transmission-format configuration parameters of the uplink resources in the DCI activation signaling transmitted from the base station, and then determine, based on the transmission-format configuration parameters of the logical channels and the transmission-format configuration parameters of the uplink resources, the first logical channels among the logical channels the transmission-format configuration parameters of which match the transmission-format configuration parameters of the uplink resources.

Herein the terminal may determine first logical channel among the logical channels a transmission-format configuration parameter of which matches the uplink scheduling information by matching the transmission-format configuration parameter of the logical channels with a transmission-format configuration parameter in the uplink scheduling information. A transmission-format configuration parameter may include SCS and PUSCH-Duration. The logical channel may also have a service transmission mode. The service transmission mode may include a fixed offset of service data, a period of service data, and a packet size of service data. The packet size may be interpreted as the amount of data in which the packet arrives at the terminal in each period or at one time. Accordingly, the uplink scheduling information may include a transmission mode of the uplink resources, and the transmission mode may include a fixed offset, a period, and a packet size. The terminal may determine one or more target logical channels among the first logical channels a service transmission mode of which matches a transmission mode in the uplink scheduling information by matching the transmission mode in the uplink scheduling information with the service transmission mode of the first logical channels, and then determine priorities of the target logical channels as the transmission priorities of the uplink resources.

Optionally, in selecting an uplink resource for data transmission based on the transmission priorities of the uplink resources, the terminal may select, from uplink resources where data to be transmitted exists in the target logical channel, an uplink resource having a highest transmission priority, for data transmission. In a case where a plurality of uplink scheduling information include semi-persistent scheduling information and/or dynamic scheduling information, the terminal may use priorities of target logical channels where data to be transmitted exists as the transmission priorities of the uplink resources corresponding to the target logical channels, and then select, from those uplink resources, an uplink resource having a highest transmission priority, for data transmission.

Figure 4:
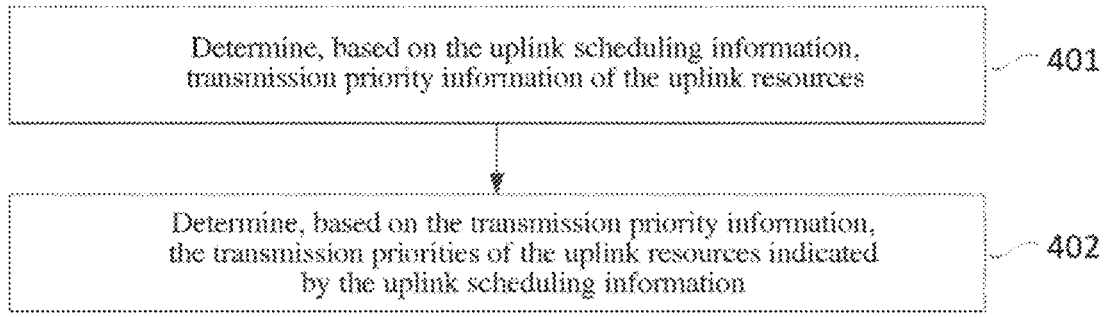
FIG. 4 illustrates a flowchart of determining transmission priorities of uplink resources according to an embodiment of the present disclosure.

FIG. 4 illustrates a flowchart of determining transmission priorities of uplink resources according to another embodiment of the present disclosure, which includes:

determining, based on the uplink scheduling information, transmission priority information of the uplink resources in 401; and determining, based on the transmission priority information, transmission priorities of uplink resources indicated by the uplink scheduling information in 402.

Herein the terminal may acquire transmission priority information in the uplink scheduling information. The transmission priority information may be transmission priority information that is added to the uplink scheduling information transmitted from the base station to the terminal for indicating the uplink resources indicated by the uplink scheduling information. The terminal may determine transmission priorities of the uplink resources based on the transmission priority information. Embodiments of the present disclosure do not limit the number of bits of the transmission priority information. The number of bits of the transmission priority information may be proportional to accuracy at which the transmission priority information is capable of indicating a transmission priority—that is, the higher the accuracy, the more the number of bits of the transmission priority information may be. For example, if the number of indicated transmission priorities is N, then the number of bits of the transmission priority information may be a result of rounding $\log_2^{N+1}$. N is a positive integer.

Optionally, in response to the uplink scheduling information being dynamic scheduling information, the terminal may acquire transmission priority information of the uplink resources in Downlink Control Information (DCI) activation signaling transmitted from the base station.

Optionally, in response to the uplink scheduling information being type-1 semi-persistent scheduling information, the terminal may acquire transmission priority information of the uplink resources in Radio Resource Control (RRC) configuration scheduling information transmitted from the base station. In response to the uplink scheduling information being type-2 semi-persistent scheduling information, the terminal may acquire transmission priority information of the uplink resources in Radio Resource Control (RRC) configuration scheduling information transmitted from the base station, or in Downlink Control Information (DCI) activation signaling transmitted from the base station.

Figure 5:
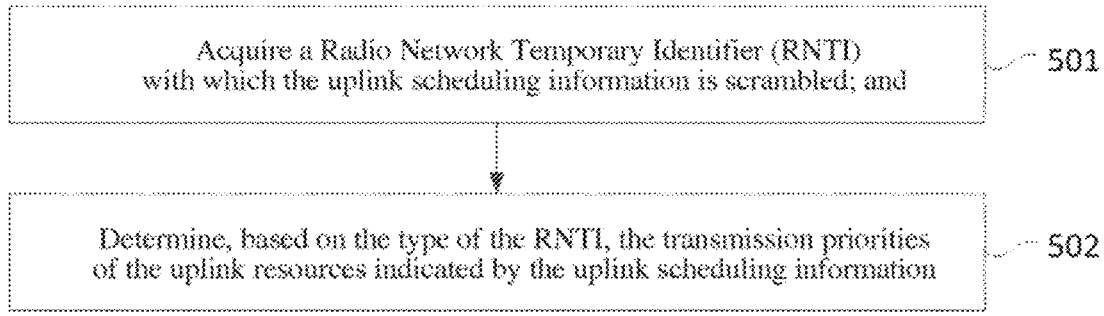
FIG. 5 illustrates a flowchart of determining transmission priorities of uplink resources according to an embodiment of the present disclosure.

FIG. 5 illustrates a flowchart of determining transmission priorities of uplink resources according to an embodiment of the present disclosure, which includes:

acquiring a Radio Network Temporary Identifier (RNTI) with which the uplink scheduling information is scrambled in 501; and determining, based on the type of the RNTI, the transmission priorities of the uplink resources indicated by the uplink scheduling information in 502.

Herein a RNTI may include a Cell-Radio Network Temporary Identifier (C-RNTI), a Configured Scheduling-Radio Network Temporary Identifier (CS-RNTI), and a Modulation and Coding Scheme-Radio Network Temporary Identifier (MCS-RNTI). Correspondingly, the transmission priorities indicated by the RNTI are arranged in a descending order of MCS-RNTI, CS-RNTI, and C-RNTI. Different types of RNTIs may indicate different levels of reliability of data transmission. An uplink resource having higher reliability may transmit service data having a higher transmission reliability requirement. Thus, the terminal may determine, based on the type of the RNTI, transmission priorities of uplink resources indicated by the uplink scheduling information, and select, for data transmission, an uplink resource having a highest priority.

With the scheme for selecting uplink resources described above, the terminal can select an uplink resource prioritized for data transmission based on transmission priorities of uplink resources. Even when uplink resources corresponding to uplink scheduling information overlap or partially overlap in a time domain, the terminal can still preferentially transmit data having a higher priority to meet a service data transmission demand with higher latency requirements.

Figure 6:
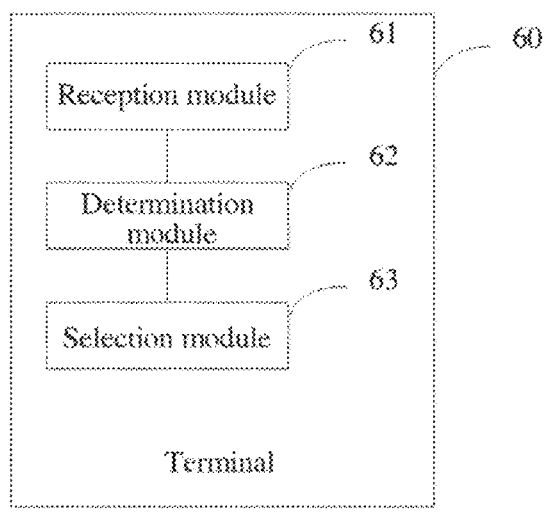
FIG. 6 illustrates a schematic diagram of a terminal according to an embodiment of the present disclosure.

Based on the inventive concept same as the uplink resource selection method described above, embodiments of the present disclosure further provide a terminal. FIG. 6 illustrates a schematic diagram of a terminal 60 according to an embodiment of the present disclosure. The terminal includes:

a reception module 61 configured to receive at least one piece of uplink scheduling information;

a determination module 62 configured to determine, based on the uplink scheduling information, transmission priorities of the uplink resources indicated by the uplink scheduling information; and a selection module 63 configured to select, based on the transmission priorities of the uplink resources, an uplink resource for data transmission.

Optionally, the selection module 63 is specifically configured to select the uplink resource having a highest transmission priority for data transmission.

Optionally, the determination module 62 is specifically configured to determine a target logical channel having the highest priority, among logical channels where data to be transmitted currently exists;

determine, based on a transmission-format configuration parameter of the target logical channel and the uplink scheduling information, an uplink resource among uplink resources indicated by the uplink scheduling information that matches the transmission-format configuration parameter; and determine, based on a preset resource selection condition, a transmission priority of the uplink resource that matches the transmission-format configuration parameter.

Optionally, the preset resource selection condition includes at least one of transmission latency of an uplink resource or transmission reliability of an uplink resource.

Optionally, in response to the unlink scheduling information being dynamic scheduling information, the determination module is specifically configured to determine, based on indication information carried by the uplink scheduling information, a target logical channel indicated by the indication information; and determine, based on a priority of the target logical channel, the transmission priorities of uplink resources indicated by the uplink scheduling information.

Optionally, in response to the unlink scheduling information being semi-persistent scheduling information, the determination module 62 is specifically configured to determine, based on transmission-format configuration parameters of logical channels and the uplink scheduling information, first logical channels among the logical channels the transmission-format configuration parameter of which matches the uplink scheduling information;

determine, based on the uplink scheduling information and service transmission modes of the first logical channels, a target logical channel among the first logical channels the service transmission mode of which matches the scheduling information; and determine, based on a priority of the target logical channel, the transmission priorities of the uplink resources indicated by the uplink scheduling information.

Optionally, the determination module 62 is specifically configured to in response to the uplink scheduling information being type-1 semi-persistent scheduling information, acquire the transmission-format configuration parameters of the uplink resources indicated by the uplink scheduling information in Radio Resource Control (RRC) configuration information transmitted from the base station; and determine, based on the transmission-format configuration parameters of the logical channels and the transmission-format configuration parameters of the uplink resources, the first logical channels among the logical channels the transmission-format configuration parameters of which match the transmission-format configuration parameters of the uplink resources.

Optionally, the determination module 62 is specifically configured to in response to the uplink scheduling information being type-2 semi-persistent scheduling information, acquire the transmission-format configuration parameters of the uplink resources in Radio Resource Control (RRC) configuration information and Downlink Control Information (DCI) activation signaling transmitted from the base station, or acquire the transmission-format configuration parameters of the uplink resources in the DCI activation signaling transmitted from the base station; and determine, based on a transmission-format configuration parameter of the LCHs and the transmission-format configuration parameter of the uplink resources, first LCHs among the LCHs the transmission-format configuration parameter of which matches the transmission-format configuration parameter of the uplink resources.

Optionally, the selection module 63 is specifically configured to select, from uplink resources where data to be transmitted exists in the target logical channel, the uplink resource having a highest transmission priority for data transmission.

Optionally, the determination module 62 is specifically configured to determine, based on the uplink scheduling information, transmission priority information of the uplink resources; and determine, based on the transmission priority information, transmission priorities of uplink resources indicated by the uplink scheduling information.

Optionally, in response to the uplink scheduling information being dynamic scheduling information, the determination module 62 is specifically configured to acquire the transmission priority information of the uplink resources in Downlink Control Information (DCI) activation signaling transmitted from the base station.

Optionally, in response to the uplink scheduling information being type-1 semi-persistent scheduling information, the determination module 62 is specifically configured to acquire transmission priority information of the uplink resources in Radio Resource Control (RRC) configuration scheduling information transmitted from the base station.

Optionally, in response to the uplink scheduling information being type-2 semi-persistent scheduling information, the determination module 62 is specifically configured to acquire transmission priority information of the uplink resources in Radio Resource Control (RRC) configuration scheduling information transmitted from the base station, or in Downlink Control Information (DCI) activation signaling transmitted from the base station.

Optionally, the determination module 62 is specifically configured to acquire a Radio Network Temporary Identifier (RNTI) with which the uplink scheduling information is scrambled; and determine, based on the type of the RNTI, the transmission priorities of the uplink resources indicated by the uplink scheduling information.

Optionally, the RNTI includes a Cell-Radio Network Temporary Identifier (C-RNTI), a Configured Scheduling-Radio Network Temporary Identifier (CS -RNTI), and a Modulation and Coding Scheme-Radio Network Temporary Identifier (MCS-RNTI); and the transmission priorities indicated by the RNTI are arranged in a descending order of MCS -RNTI, CS-RNTI, and C-RNTI.

Figure 7:
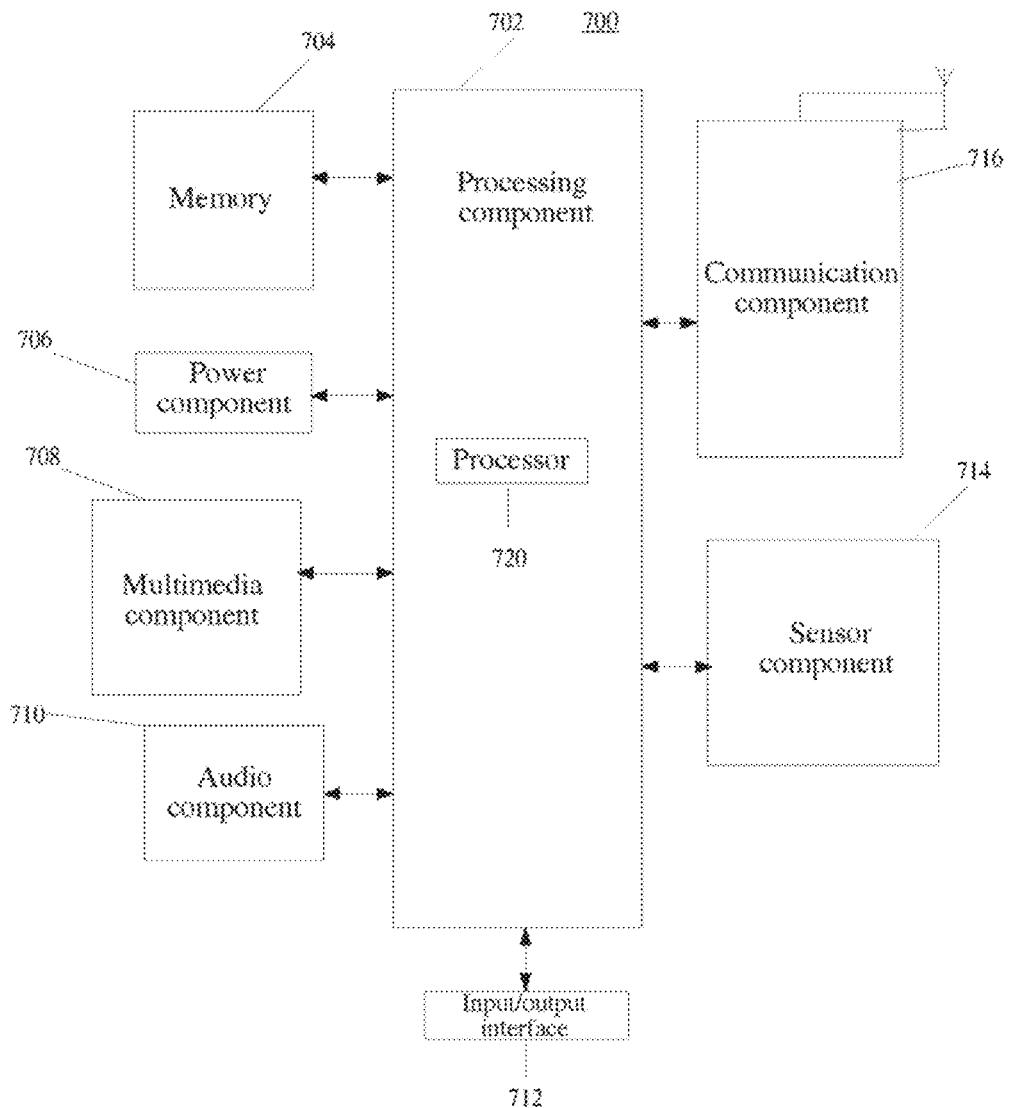
FIG. 7 is a structural diagram of a terminal according to an embodiment of the present disclosure.

FIG. 7 is a block diagram of a terminal 700 for selecting uplink resources according to an exemplary embodiment of the present disclosure. The terminal 700 may be, for example, a mobile phone, a computer, a digital broadcasting terminal, a messaging device, a game console, a tablet device, medical equipment, fitness equipment, a personal digital assistant, and the like.

Referring to FIG. 7, the terminal 700 may include one or more of processing component 702, memory 704, power component 706, multimedia component 708, audio component 710, input/output (I/O) interface 712, sensor component 714, and communication component 716.

Processing component 702 is to control overall operations of the terminal 700, such as the operations associated with display, telephone calls, data communications, camera operations, and recording operations. Processing component 702 can include one or more processors 720 configured to execute instructions to perform all or part of the steps included in the above-described methods. Processing component 702 may include one or more modules configured to facilitate the interaction between the processing component 702 and other components. For example, processing component 702 may include a multimedia module configured to facilitate the interaction between multimedia component 708 and processing component 702.

Memory 704 is configured to store various types of data to support the operation of the terminal 700. Examples of such data include instructions for any applications or methods operated on or performed by the terminal 700, contact data, phonebook data, messages, pictures, video, etc. In an example of the present disclosure, memory 704 may be used to store data blocks, mappings, or other things retrieved from a distributed system. Memory 704 may be implemented using any type of volatile or non-transitory memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

Power component 706 is configured to provide power to various components of the terminal 700. Power component 706 may include a power management system, one or more power sources, and any other components associated with the generation, management, and distribution of power in the terminal 700.

Multimedia component 708 includes a screen providing an output interface between the terminal 700 and the user. In some examples, the screen may include a liquid crystal display (LCD) and a touch panel (TP). If the screen includes the touch panel, the screen may be implemented as a touch screen to receive input signals from the user. The touch panel may include one or more touch sensors configured to sense touches, swipes, and gestures on the touch panel. The touch sensors may sense not only a boundary of a touch or swipe operation, but also a period of time and a pressure associated with the touch or swipe operation. In some examples, multimedia component 708 may include a front camera and/or a rear camera. The front camera and the rear camera may receive an external multimedia datum while the terminal 700 is in an operation mode, such as a photographing mode or a video mode. Each of the front camera and the rear camera may be a fixed optical lens system or may have focus and/or optical zoom capabilities.

Audio component 710 is configured to output and/or input audio signals. For example, audio component 710 may include a microphone (MIC) configured to receive an external audio signal when the terminal 700 is in an operation mode, such as a call mode, a recording mode, and a voice recognition mode. The received audio signal may be further stored in memory 704 or transmitted via communication component 716. In some examples, audio component 710 further includes a speaker configured to output audio signals.

I/O interface 712 is configured to provide an interface between processing component 702 and peripheral interface modules, such as a keyboard, a click wheel, buttons, and the like. The buttons may include, but are not limited to, a home button, a volume button, a starting button, and a locking button.

Sensor component 714 may include one or more sensors configured to provide status assessments of various aspects of the terminal 700. For example, sensor component 714 may detect an open/closed status of the terminal 700, relative positioning of components which are e.g., the display and the keypad of the terminal 700, a change in position of the terminal 700 or a component of the terminal 700, a presence or absence of user contact with the terminal 700, an orientation or an acceleration/deceleration of the terminal 700, and a change in temperature of the terminal 700. Sensor component 714 may include a proximity sensor configured to detect the presence of nearby objects without any physical contact. Sensor component 714 may also include a light sensor, such as a complementary metal oxide semiconductor (CMOS) or charge-coupled device (CCD) image sensor, for use in imaging applications. In some examples, sensor component 714 may also include an accelerometer sensor, a gyroscope sensor, a magnetic sensor, a pressure sensor, or a temperature sensor.

Communication component 716 is configured to facilitate wired or wireless communication between the terminal 700 and other devices. The terminal 700 can access a wireless network based on a communication standard, such as WiFi, 2G, or 3G, 4G, or a combination thereof. In an exemplary embodiment, communication component 716 receives a broadcast signal or broadcast associated information from an external broadcast management system via a broadcast channel. In an exemplary embodiment, communication component 716 may include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, or any other suitable technologies.

In an exemplary embodiment, the terminal 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an exemplary embodiment, there is also provided a non-transitory computer readable storage medium such as memory 704 storing instructions executable by processor 720 of the terminal 700, for performing the above-described methods.

In an exemplary embodiment, there is also provided a non-transitory computer readable storage medium such as memory 704 storing instructions executable by processor 720 of the terminal 700, for performing the above-described methods.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages-, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry such as programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the present disclosure. It can be appreciated that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/operations specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/operations specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/operations specified in the flowchart and/or block diagram block or blocks.

The flowchart and block diagrams in the drawings illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur in an order different from that noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flowchart illustration, can be implemented by special purpose hardware-based systems that perform the specified functions or operations, or combinations of special purpose hardware and computer instructions.

Various embodiments of the present disclosure have been described above. The above descriptions are exemplary, not exhaustive. The present disclosure is not limited to those embodiments. Modifications and variations without departing from the scope and spirit of the described embodiments will be apparent to a person skilled in the art. The terms used herein are intended to best explain the principles and practical applications of the examples and explain how they improve on the techniques on the market, or to enable persons other than a person skilled in the art to understand the embodiments.

Optionally, selecting, based on the transmission priorities of the uplink resources, an uplink resource for data transmission comprises: selecting the uplink resources having a highest transmission priority for data transmission.

Optionally, determining, based on the uplink scheduling information, transmission priorities of the uplink resources indicated by the uplink scheduling information comprises: determining a target logical channel having the highest priority, among logical channels where data to be transmitted currently exists; determining, based on a transmission-format configuration parameter of the target logical channel and the uplink scheduling information, an uplink resource among uplink resources indicated by the uplink scheduling information that matches the transmission-format configuration parameter; and determining, based on a preset resources selection condition, a transmission priority of the uplink resources that matches the transmission-format configuration parameter.

Optionally, the preset resources selection condition includes at least one of transmission latency of an uplink resource or transmission reliability of an uplink resource.

Optionally, in response to the uplink scheduling information being dynamic scheduling information, determining based on the uplink scheduling information, the transmission priorities of uplink resources indicated by the uplink scheduling information comprises: determining based on indication information carried by the uplink scheduling information, a target logical channel indicated by the indication information; and determining, based on a priority of the target logical channel, the transmission priorities of uplink resources indicated by the uplink scheduling information.

Optionally, in response to the uplink scheduling information being semi-persistent scheduling information, determining, based on the uplink scheduling information, the transmission priorities of the uplink resources indicated by the uplink scheduling information comprises: determining, based on transmission-format configuration parameters of logical channels and the uplink scheduling information, first logical channels among the logical channels the transmission-format configuration parameters of which match the uplink scheduling information; determining, based on the uplink scheduling information and service transmission modes of the first logical channels, a target logical channel among the first logical channels the service transmission mode of which matches the scheduling information; and determining, based on a priority of the target logical channel, the transmission priorities of the uplink resources indicated by the uplink scheduling information.

Optionally, determining, based on the transmission-format configuration parameters of the logical channels and the uplink scheduling information, the first logical channels among the logical channels the transmission-format configuration parameters of which match the uplink scheduling information comprises, in response to the uplink scheduling information being type-1 semi-persistent scheduling information, acquiring the transmission-format configuration parameters of the uplink resources indicated by the uplink scheduling information in Radio Resource Control (RRC) configuration information; and determining, based on the transmission-format configuration parameters of the logical channels and the transmission-format configuration parameters of the uplink resources, the first logical channels among the logical channels the transmission-format configuration parameters of which match the transmission-format configuration parameters of the uplink resources.

Optionally, determining, based on the transmission-format configuration parameters of the logical channels and the uplink scheduling information, the first logical channels among the logical channels the transmission-format configuration parameters of which match the uplink scheduling information comprises: in response to the uplink scheduling information being type-2 semi-persistent scheduling information, acquiring the transmission-format configuration parameters of the uplink resources in Radio Resource Control (RRC) configuration scheduling information and Downlink Control Information (DCI) activation signaling, or acquiring the transmission-format configuration parameters of the uplink resources in the DCI activation signaling; and determining, based on the transmission-format configuration parameters of the logical channels and the transmission-format configuration parameters of the uplink resources, the first logical channels among the logical channels the transmission-format configuration parameters of which match the transmission-format configuration parameters of the uplink resources.

Optionally, selecting, based on the transmission priorities, the uplink resource for data transmission comprises: selecting, from the uplink resources where data to be transmitted exists in the target logical channel, the uplink resource having a highest transmission priority for data transmission.

Optionally, determining, based on the uplink scheduling information, the transmission priorities of the uplink resources indicated by the uplink scheduling information comprises: determining, based on the uplink scheduling information, transmission priority information of the uplink resources; and determining, based on the transmission priority information, the transmission priorities of the uplink resources indicated by the uplink scheduling information.

Optionally, in response to the uplink scheduling information being dynamic scheduling information, determining, based on the uplink scheduling information, the transmission priority information of the uplink resources comprises: acquiring the transmission priority information of the uplink resources in Downlink Control Information (DCI) activation signaling.

Optionally, in response to the uplink scheduling information being type-1 semi-persistent scheduling information, determining based on the uplink scheduling information, the transmission priority information of the uplink resources comprises: acquiring the transmission priority information of the uplink resources in Radio Resource Control (RRC) configuration scheduling information.

Optionally, in response to the uplink scheduling information being type-2 semi-persistent scheduling information, determining based on the uplink scheduling information, the transmission priority information of the uplink resources comprises: acquiring the transmission priority information of the uplink resources in Radio Resource Control (RRC) configuration scheduling information, or in Downlink Control Information (DCI) activation signaling.

Optionally, determining, based on the uplink scheduling information, the transmission priorities of the uplink resources indicated by the uplink scheduling information comprises: acquiring a Radio Network Temporary Identifier (RNTI) with which the uplink scheduling information is scrambled; and determining, based on the type of the RNTI, the transmission priorities of the uplink resources indicated by the uplink scheduling information.

Optionally, the RNTI includes a Cell-Radio Network Temporary Identifier (C RNTI), a Configured Scheduling-Radio Network Temporary Identifier (CS-RNTI), and a Modulation and Coding Scheme-Radio Network Temporary Identifier (MCS-RNTI), and the transmission priorities indicated by the RNTI are arranged in a descending order of MCS-RNTI, CS -RNTI, and C-RNTI.

Optionally, one piece of the uplink scheduling information indicates one of the uplink resources.

According to another aspect of the present disclosure, there is provided a terminal, comprising; a reception module configured to receive at least one piece of uplink scheduling information; a determination module configured to determine, based on the uplink scheduling information, transmission priorities of the uplink resources indicated by the uplink scheduling information; and a selection module configured to select, based on the transmission priorities of the uplink resources, an uplink resource for data transmission.

Optionally, the selection module is specifically configured to select the uplink resource having a highest transmission priority for data transmission.

Optionally, the determination module is specifically configured to determine a target logical channel having the highest priority, among logical channels where data to be transmitted currently exists; determine, based on a transmission-format configuration parameter of the target logical channel and the uplink scheduling information, an uplink resource among uplink resources indicated by the uplink scheduling information that matches the transmission-format configuration parameter; and determine, based on a preset resource selection condition, a transmission priority of the uplink resources that matches the transmission-format configuration parameter.

Optionally, the present resources selection condition includes at least one of transmission latency of an uplink resource or transmission reliability of an uplink resource.

Optionally, in response to the uplink scheduling information being dynamic scheduling information, the determination module is specifically configured to determine, based on indication information carried by the uplink scheduling information, a target logical channel indicated by the indication information; and determine, based on a priority of the target logical channel, the transmission priorities of uplink resources indicated by the uplink scheduling information.

Optionally, in response to the uplink scheduling information being semi-persistent scheduling information, the determination module is specifically configured to determine, based on transmission-format configuration parameters of logical channels and the uplink scheduling information, first logical channels among the logical channels the transmission-format configuration parameters of which match the uplink scheduling information; determine, based on the uplink scheduling information and service transmission modes of the first logical channels, a target logical channel among the first logical channels the service transmission mode of which matches the scheduling information; and determine, based on a priority of the target logical channel, the transmission priorities of the uplink resources indicated by the uplink scheduling information.

Optionally, the determination module is specifically configured to, in response to the uplink scheduling information being type-1 semi-persistent scheduling information, acquire the transmission-format configuration parameters of the uplink resources indicated by the uplink scheduling information in Radio Resource Control (RRC) configuration information; and determine, based on the transmission-format configuration parameters of the logical channels and the transmission-format configuration parameters of the uplink resources, the first logical channels among the logical channels the transmission-format configuration parameters of which match the transmission-format configuration parameters of the uplink resources.

Optionally, the determination module is specifically configured to, in response to the uplink scheduling information being type-2 semi-persistent scheduling information, acquire the transmission-format configuration parameters of the uplink resources in Radio Resource Control (RRC) configuration information and Downlink Control Information (DCI) activation signaling, or acquire the transmission-format configuration parameters of the uplink resources in the DCI activation signaling; and determine, based on the transmission-format configuration parameters of the logical channels and the transmission-format configuration parameters of the uplink resources, the first logical channels among the logical channels the transmission-format configuration parameters of which match the transmission-format configuration parameters of the uplink resources.

Optionally, the selection module is specifically configured to select, from uplink resources where data to be transmitted exists in the target logical channel, the uplink resource having a highest transmission priority for data transmission.

Optionally, the determination module is specifically configured to determine, based on the uplink scheduling information, transmission priority information of the uplink resources; and determine, based on the transmission priority information, transmission priorities of uplink resources indicated by the uplink scheduling information.

Optionally, in response to the uplink scheduling information being dynamic scheduling information, the determination module is specifically configured to acquire the transmission priority information of the uplink resources in Downlink Control Information (DCI) activation signaling.

Optionally, in response to the uplink scheduling information being type-1 semi-persistent scheduling information, the determination module is configured to, acquire transmission priority information of the uplink resources in Radio Resource Control (RRC) configuration scheduling information.

Optionally, in response to the uplink scheduling information being type-1 semi-persistent scheduling information, the determination module is configured to, acquire transmission priority information of the uplink resources in Radio Resource Control (RRC) configuration scheduling information, or in Downlink Control Information (DCI) activation signaling.

Optionally, the determination module is specifically configured to, acquire a Radio Network Temporary Identifier (RNTI) with which the uplink scheduling information is scrambled; and determine, based on the type of the RNTI, the transmission priorities of the uplink resources indicated by the uplink scheduling information Optionally, the RNTI includes a Cell-Radio Network Temporary Identifier (C-RNTI), a Configured Scheduling-Radio Network Temporary Identifier (CS-RNTI), and a Modulation and Coding Scheme-Radio Network Temporary Identifier (MCS-RNTI); and the transmission priorities indicated by the RNTI are arranged in a descending order of MCS-RNTI, CS-RNTI, and C-RNTI.

Optionally, one piece of the uplink scheduling information indicates one of the uplink resources.

What is claimed is:

1. A method for selecting uplink resources, wherein the method comprises:
receiving at least one piece of uplink scheduling information;
determining, based on the uplink scheduling information, transmission priorities of the uplink resources indicated by the uplink scheduling information; and selecting, based on the transmission priorities of the uplink resources, an uplink resource from among the uplink resources for data transmission,
wherein determining the transmission priorities of the uplink resources indicated by the uplink scheduling information comprises:
determining a target logical channel having the highest priority, among logical channels where data to be transmitted currently exists;
determining, based on a transmission-format configuration parameter of the target logical channel and the uplink scheduling information, uplink resources among the uplink resources indicated by the uplink scheduling information that match the transmission-format configuration parameter; and
determining, based on a preset resource selection condition, a transmission priority of the uplink resources that match the transmission-format configuration parameter.

2. The method according to claim 1, wherein said selecting, based on the transmission priorities of the uplink resources, an uplink resource for data transmission comprises:
selecting an uplink resource, from among the uplink resources, having a highest transmission priority for data transmission.

3. The method according to claim 1, wherein the preset resource selection condition includes at least one of transmission latency of an uplink resource or transmission reliability of an uplink resource.

4. The method according to claim 1, wherein, in response to the uplink scheduling information being dynamic scheduling information, said determining, based on the uplink scheduling information, the transmission priorities of uplink resources indicated by the uplink scheduling information instead comprises:
determining, based on indication information carried by the uplink scheduling information, a target logical channel among the logical channels indicated by the indication information; and determining, based on a priority of the target logical channel, the transmission priorities of uplink resources indicated by the uplink scheduling information.

5. The method according to claim 1, wherein, in response to the uplink scheduling information being semi-persistent scheduling information, said determining, based on the uplink scheduling information, the transmission priorities of the uplink resources indicated by the uplink scheduling information instead comprises:
determining, based on transmission-format configuration parameters of the logical channels and the uplink scheduling information, first logical channels among the logical channels having the transmission-format configuration parameters that match the uplink scheduling information;
determining, based on the uplink scheduling information and service transmission modes of the first logical channels, a target logical channel among the first logical channels the service transmission mode of which matches the scheduling information; and
determining, based on a priority of the target logical channel, the transmission priorities of the uplink resources indicated by the uplink scheduling information.

6. The method according to claim 5, wherein said determining, based on the transmission-format configuration parameters of the logical channels and the uplink scheduling information, the first logical channels among the logical channels the transmission-format configuration parameters of which match the uplink scheduling information comprises:
in response to the uplink scheduling information being type-1 semi-persistent scheduling information, acquiring the transmission-format configuration parameters of the uplink resources indicated by the uplink scheduling information in Radio Resource Control (RRC) configuration information; and
determining, based on the transmission-format configuration parameters of the logical channels and the transmission-format configuration parameters of the uplink resources, the first logical channels among the logical channels having the transmission-format configuration parameters that match the transmission-format configuration parameters of the uplink resources.

7. The method according to claim 5, wherein said determining, based on the transmission-format configuration parameters of the logical channels and the uplink scheduling information, the first logical channels among the logical channels the transmission-format configuration parameters of which match the uplink scheduling information comprises:
in response to the uplink scheduling information being type-2 semi-persistent scheduling information, acquiring the transmission-format configuration parameters of the uplink resources m Radio Resource Control (RRC) configuration scheduling information and Downlink Control Information (DCI) activation signaling, or acquiring the transmission-format configuration parameters of the uplink resources in the DCI activation signaling; and
determining, based on the transmission-format configuration parameters of the logical channels and the transmission-format configuration parameters of the uplink resources, the first logical channels among the logical channels having the transmission-format configuration parameters that match the transmission-format configuration parameters of the uplink resources.

8. The method according to claim 4, wherein said selecting, based on the transmission priorities, the uplink resource for data transmission comprises:

selecting, from the uplink resources where data to be transmitted exists in the target logical channel, the uplink resource having a highest transmission priority for data transmission.

9. The method according to claim 1, wherein the uplink scheduling information comprises transmission priority information of the uplink resources, and the transmission priorities of the uplink resources are determined using the transmission priority information.

10. The method according to claim 9, wherein, in response to the uplink scheduling information being dynamic scheduling information, the transmission priority information of the uplink resources is acquired in Downlink Control Information (DCI) activation signal.

11. The method according to claim 9, wherein, in response to the uplink scheduling information being type-1 semi-persistent scheduling information, the transmission priority information of the uplink resources is acquired in Radio Resource Control (RRC) configuration scheduling information.

12. The method according to claim 9, wherein, in response to the uplink scheduling information being type-2 semi-persistent scheduling information, the transmission priority information of the uplink resources is acquired in Radio Resource Control (RRC) configuration scheduling information, or in Downlink Control Information (DCI) activation signaling.

13. The method according to claim 1, wherein said determining, based on the uplink scheduling information, the transmission priorities of the uplink resources indicated by the uplink scheduling information further comprises:
acquiring a Radio Network Temporary Identifier (RNTI) with which the uplink scheduling information is scrambled; and
determining, based on the type of the RNTI, the transmission priorities of the uplink resources indicated by the uplink scheduling information.

14. The method according to claim 13, wherein the RNTI includes a Cell- Radio Network Temporary Identifier (C-RNTI), a Configured Scheduling -Radio Network Temporary Identifier (CS-RNTI), and a Modulation and Coding Scheme-Radio Network Temporary Identifier (MCS-RNTI), and the transmission priorities indicated by the RNTI are arranged in a descending order of MCS-RNTI, CS-RNTI, and C-RNTI.

15. The method according to claim 1, wherein one piece of the uplink scheduling information indicates one of the uplink resources.

16. A terminal, comprising:
a processor; and
a memory configured to store instructions executable by the processor,
wherein the processor is configured to, responsive to the instructions stored by the memory being executed by the processor, implement a method comprising: receiving at least one piece of uplink scheduling information;
determining, based on the uplink scheduling information, transmission priorities of the uplink resources indicated by the uplink scheduling information; and
selecting, based on the transmission priorities of the uplink resources, an uplink resource for data transmission,
wherein determining the transmission priorities of the uplink resources indicated by the uplink scheduling information comprises:
determining a target logical channel having the highest priority, among logical channels where data to be transmitted currently exists;
determining, based on a transmission-format configuration parameter of the target logical channel and the uplink scheduling information, uplink resources among the uplink resources indicated by the uplink scheduling information that match the transmission-format configuration parameter; and
determining, based on a preset resource selection condition, a transmission priority of the uplink resources that match the transmission-format configuration parameter.

17. A non-transitory computer-readable medium having computer program instructions stored thereon, wherein the computer program instructions, upon being executed by a processor, implement a method comprising:
receiving at least one piece of uplink scheduling information;
determining, based on the uplink scheduling information, transmission priorities of the uplink resources indicated by the uplink scheduling information; and selecting, based on the transmission priorities of the uplink resources, an uplink resource for data transmission,
wherein determining the transmission priorities of the uplink resources indicated by the uplink scheduling information comprises:
determining a target logical channel having the highest priority, among logical channels where data to be transmitted currently exists;
determining, based on a transmission-format configuration parameter of the target logical channel and the uplink scheduling information, uplink resources among the uplink resources indicated by the uplink scheduling information that match the transmission-format configuration parameter; and
determining, based on a preset resource selection condition, a transmission priority of the uplink resources that match the transmission-format configuration parameter.

* * * * *